(12) United States Patent
Rask et al.

(10) Patent No.: US 7,980,980 B2
(45) Date of Patent: Jul. 19, 2011

(54) HYBRID POWERTRAIN

(75) Inventors: Eric M. Rask, Royal Oak, MI (US);
Peter J. Savagian, Bloomfield Hills, MI (US); Alan G. Holmes, Clarkston, MI (US); Larry T. Nitz, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 668 days.

(21) Appl. No.: 11/939,610

(22) Filed: Nov. 14, 2007

(65) Prior Publication Data

US 2009/0124451 A1    May 14, 2009

(51) Int. Cl.
*F16H 3/72* (2006.01)
*F16H 48/30* (2006.01)
*B60K 1/02* (2006.01)

(52) U.S. Cl. .............................. 475/5; 475/150; 477/3

(58) Field of Classification Search ............... 475/5, 150, 475/151; 477/3; 180/65.21, 65.225, 65.23, 180/65.235, 65.24
See application file for complete search history.

(56) References Cited

U.S. PATENT DOCUMENTS

| | | | |
|---|---|---|---|
| 5,310,387 A | 5/1994 | Savagian | |
| 5,343,970 A | 9/1994 | Severinsky | |
| 6,209,672 B1 | 4/2001 | Severinsky | |
| 6,338,391 B1 | 1/2002 | Severinsky et al. | |
| 6,527,658 B2 | 3/2003 | Holmes et al. | |
| 6,554,088 B2 | 4/2003 | Severinsky et al. | |
| 6,558,289 B2 | 5/2003 | Chung | |
| 6,692,394 B2* | 2/2004 | Takenaka ........................... 475/5 |
| 7,104,347 B2 | 9/2006 | Severinsky et al. | |
| 7,128,675 B2 | 10/2006 | Klemen et al. | |
| 7,217,211 B2 | 5/2007 | Klemen et al. | |
| 7,219,757 B2* | 5/2007 | Tomita et al. ............ 180/65.275 |
| 7,220,203 B2 | 5/2007 | Holmes et al. | |
| 7,237,634 B2 | 7/2007 | Severinsky et al. | |
| 7,278,941 B2 | 10/2007 | Holmes et al. | |
| 7,338,401 B2 | 3/2008 | Klemen et al. | |
| 7,373,933 B2* | 5/2008 | Kamada et al. .......... 123/568.21 |
| 7,392,871 B2 | 7/2008 | Severinsky et al. | |
| 7,455,134 B2 | 11/2008 | Severinsky et al. | |
| 7,494,435 B2* | 2/2009 | Bucknor et al. .................. 475/5 |
| 7,520,353 B2 | 4/2009 | Severinsky et al. | |

(Continued)

OTHER PUBLICATIONS

Office Action Mailed Dec. 18, 2009 for U.S. Appl. No. 11/852,639.

(Continued)

*Primary Examiner* — Roger Pang
(74) *Attorney, Agent, or Firm* — Quinn Law Group, PLLC

(57) ABSTRACT

A hybrid powertrain is provided that includes an engine operatively connected with an input member. The powertrain includes a transmission with first and second electric motor/generators, a differential gear set having multiple members, and selectively engagable torque-transmitting mechanisms. The input member, the output member, the engine and the motor/generators are selectively interconnected through the differential gear set by engagement of the torque-transmitting mechanisms in different combinations. An electronic controller controls the electric motor/generators, the engine and the torque-transmitting mechanisms to provide multiple operating modes between the input member and the output member, including an electric-only operating mode in which the engine is off and one motor generator acts as a motor to provide torque at the output member while the other electric motor/generator can remain substantially stationary, and another electric-only operating mode in which both electric motor/generators act as motors to provide torque at the output member.

17 Claims, 3 Drawing Sheets

U.S. PATENT DOCUMENTS

| | | |
|---|---|---|
| 7,559,388 B2 | 7/2009 | Severinsky et al. |
| 7,712,560 B2 * | 5/2010 | Kozarekar ................. 180/65.21 |
| 7,833,119 B2 * | 11/2010 | Klemen et al. ..................... 475/5 |
| 2004/0058769 A1 * | 3/2004 | Larkin ............................... 475/5 |
| 2006/0019784 A1 * | 1/2006 | Sowul et al. ...................... 475/5 |
| 2006/0052199 A1 * | 3/2006 | Singh et al. ....................... 475/5 |
| 2008/0103002 A1 * | 5/2008 | Holmes ............................ 475/5 |
| 2008/0125264 A1 * | 5/2008 | Conlon et al. .................... 475/5 |
| 2008/0207373 A1 | 8/2008 | Conlon |

OTHER PUBLICATIONS

Office Action Mailed Jun. 7, 2010 for U.S. Appl. No. 11/852,638.

Office Action Mailed Jul. 12, 2010 for U.S. Appl. No. 11/852,639.

* cited by examiner

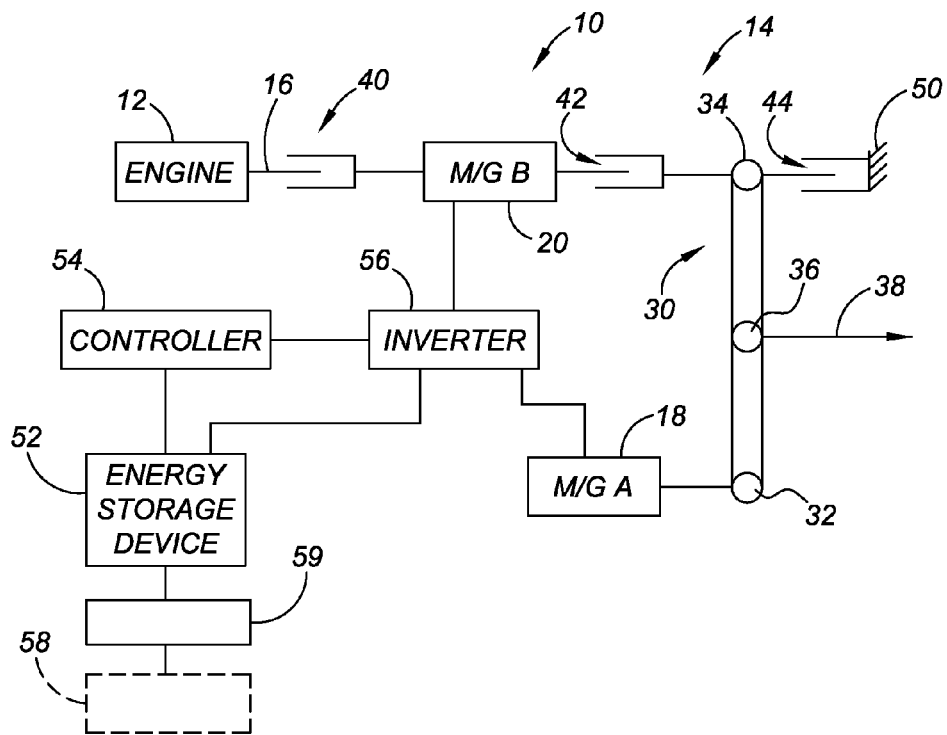
FIG. 1
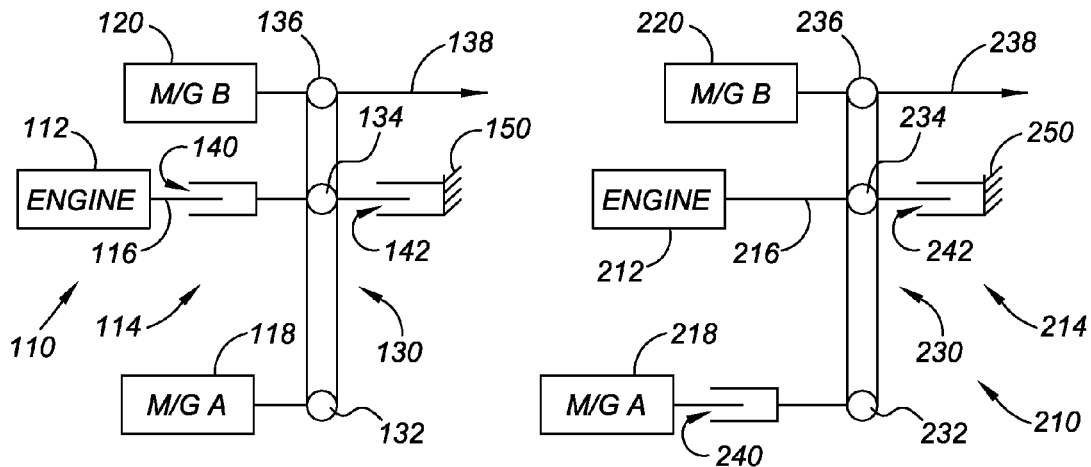
FIG. 2
FIG. 3

HYBRID POWERTRAIN

TECHNICAL FIELD

The invention relates to a hybrid powertrain with an electric-only operating mode in which multiple motor/generators act as motors to provide torque at an output member.

BACKGROUND OF THE INVENTION

Electrically-variable transmissions typically have an input member connected to an engine and one or two motor/generators connected to different members of planetary gear sets to allow one or more electrically-variable modes of operation, fixed speed ratio modes, and an electric-only (battery powered) mode, when connected with a battery. Electrically-variable transmissions may improve vehicle fuel economy in a variety of ways. For instance, the engine may be turned off at idle, during periods of deceleration and braking, and during periods of low speed or light load operation to eliminate efficiency losses due to engine drag. Captured braking energy (via regenerative braking) or energy stored by one of the motors acting as a generator during periods when the engine is operating is utilized during these engine off periods to keep the engine off longer, supplement engine torque or power and/or operate at a lower engine speed, or supplement accessory power supplies. Transient demand for engine torque or power is supplemented by the motor/generators during operation in engine-on, electrically-variable modes, allowing for downsizing the engine without reducing apparent vehicle performance. Additionally, the engine may be operated at or near the optimal efficiency point for a given power demand because the speed ratio between the engine and the output member of the transmission can be continuously variable by the action of a gear set and a motor/generator. Additionally, the motor/generators are very efficient in accessory power generation and electric power from the battery serves as an available torque reserve allowing operation at a relatively low transmission numerical speed ratio.

SUMMARY OF THE INVENTION

A hybrid powertrain of improved efficiency is provided that operates in an electric-only operating mode in which multiple motor/generators act as motors to provide torque at an output member. Each of the motor/generators may be separately controlled, which allows the powertrain to operate more efficiently than if only a single motor/generator acts as a motor in an electric-only operating mode. When a single motor/generator must power the vehicle in an electric-only operating mode, it must be designed to cover a large range of operating conditions, including conditions that require the ability to operate at a certain peak capability at which it is less efficient than under more typical operating conditions.

Specifically, a hybrid powertrain is provided that includes an engine operatively connected with an input member. The engine is not limited to a certain type of engine and could be an internal combustion engine, a diesel engine, a fuel cell, etc. The powertrain includes a transmission with a first and a second electric motor/generator, a differential gear set having multiple members, and selectively engagable torque-transmitting mechanisms. The input member, the output member, the engine and the motor/generators are selectively interconnected through the differential gear set by engagement of the torque-transmitting mechanisms in different combinations. An electronic controller operatively connected to the electric motor/generators and is configured to control the electric motor/generators, the engine and the torque-transmitting mechanisms to provide multiple operating modes between the input member and the output member, including an electric-only operating mode in which one of the first and second electric motor/generators acts as a motor to provide torque at the output member while the other of the first and second electric motor/generators is held to, or is controlled by the controller to, or is free to seek at equilibrium (i.e., because its speed not constrained by the differential gear set) a stationary or near stationary speed to minimize losses. Another electric-only operating mode is also available in which the engine is off and an electric-only operating mode in which the engine is off and both electric motor/generators act as motors to provide torque at the output member. Preferably, an engine-only operating mode is available, as well as at least one electrically-variable operating mode, which may be input-split, output-split, or compound-split, depending on the specific transmission arrangement.

The transmission may be a "plug-in" hybrid transmission in that an energy storage device connected to each of the motor/generators for providing power thereto or receiving power therefrom may be configured to be operatively connectable with an offboard power supply for recharging the energy storage device.

As used herein, a motor/generator "acts as a motor" when it receives stored energy from the energy storage device in order to provide mechanical power to the transmission. A motor/generator "acts as a generator" when it receives mechanical power from the transmission in order to provide energy to the energy storage device.

Within the scope of the invention, the motor/generators may have substantially identical maximum torque and power output, substantially identical input voltage and input current requirements, or may be different in these aspects. Thus, considerable flexibility in designing the engine to meet different desired operating capabilities and spatial packaging requirements is afforded.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic illustration of a first embodiment of a hybrid powertrain having one differential gear set shown in lever diagram form;

FIG. 2 is a schematic illustration of a second embodiment of a hybrid powertrain having one differential gear set shown in lever diagram form;

FIG. 3 is a schematic illustration of a third embodiment of a hybrid powertrain having one differential gear set shown in lever diagram form;

DESCRIPTION OF THE PREFERRED EMBODIMENTS

Figure 4:
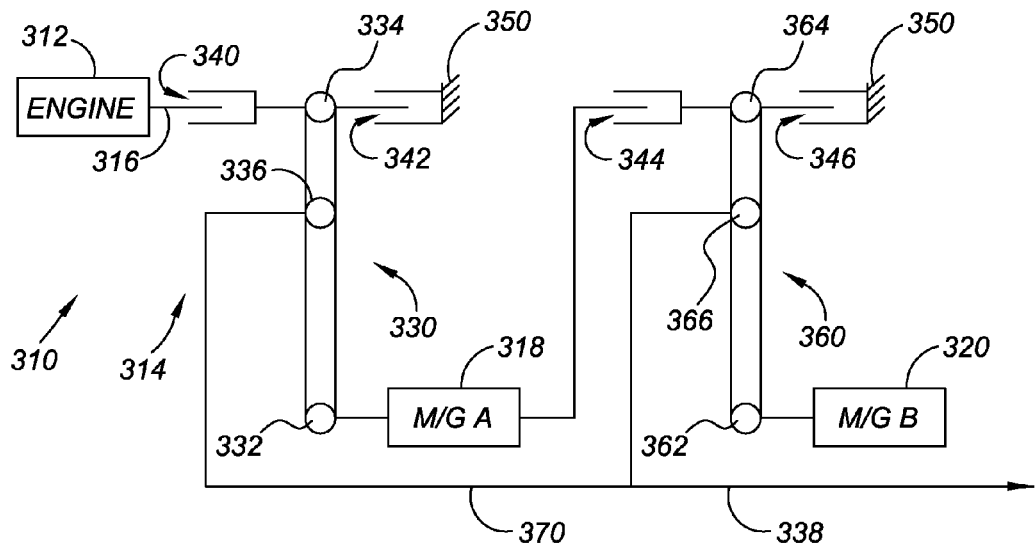
FIG. 4 is a schematic illustration of a fourth embodiment of a hybrid powertrain having two differential gear sets shown in lever diagram form.

Referring to the drawings, wherein like reference numbers refer to like components, FIG. 1 shows a hybrid powertrain 10 that includes an engine 12 operatively connected with a hybrid transmission 14. Within the scope of the invention, the engine 12 may be an internal combustion engine, a diesel engine, a fuel cell, or any other known power plant.

The hybrid transmission 14 includes an input member 16 operatively connected for rotation with an engine output member, such as through a dampening mechanism, as is known. The hybrid transmission 14 includes a first motor/generator 18, labeled M/G A, and a second motor/generator 20, labeled M/G B, both of which are operatively connectable to a differential gear set 30. The motor/generators 18, 20 each include a rotor portion and a stator portion, as is known. Connections of either of the motor/generators 18, 20 to other components of the powertrain 10 such as to members of the differential gear set 30, whether fixed connections or selective connections, are connections with the respective rotor portions of the motor/generators 18, 20.

The differential gear set 30 has a first member 32 that is continuously connected for common rotation with motor/generator 18, a second member 34, and a third member 36 that is continuously connected for common rotation with an output member 38. The differential gear set 30 is shown in lever diagram form, with the members represented as nodes on a lever, as is understood by those skilled in the art. The differential gear set is preferably a planetary gear set having a sun gear member, a ring gear member, and a carrier member that rotatably supports a plurality of pinion gears that mesh with the sun gear member and the ring gear member. For example, the first member 32 may be a sun gear member, the second member 34 may be a ring gear member, and the third member 36 may be a carrier member. Many alternate embodiments of differential gear sets, well known to those skilled in the art, may be utilized in the invention. For example, the first member 32 may be a sun gear member, the second member 34 may be a carrier member supporting pairs of intermeshing pinion gears, and the third member 36 may be a ring gear member.

The hybrid transmission 14 includes a plurality of torque-transmitting mechanisms including a first torque-transmitting mechanism 40 that is selectively engagable to connect the input member 16 with the motor/generator 20, a second torque-transmitting mechanism 42 that is selectively engagable to connect the motor/generator 20 with the second member 34, and a third torque-transmitting mechanism 44 that is selectively engagable to ground the second member 34 to a stationary housing 50, such as a casing for the transmission 14. The torque-transmitting mechanisms 40 and 42 may be rotating friction clutches, dog clutches or any other suitable type of torque-transmitting mechanism. The torque-transmitting mechanism 44 may be a friction clutch with a stationary component, and may be referred to as a brake.

The powertrain 10 has an onboard energy storage device 52 that is operatively connected to the motor/generators 18, 20 such that the motor/generators 18, 20 may transfer power to or receive power from the energy storage device 52. An electronic controller 54 is operatively connected to the energy storage device 52 to control the distribution of power from or to the energy storage device to the motor/generators 18, 20 through a power inverter 56. The controller 54 (or one or more separate controllers) is also operatively connected to the engine 12 and the torque-transmitting mechanisms 40, 42, 44, and controls engagement and disengagement thereof based on vehicle operating conditions. As used herein, an "onboard" energy storage device is an energy storage device that is designed for mounting on a vehicle to which the associated powertrain with the motor/generators is also mounted. An onboard energy storage device may be one or more batteries. Other onboard energy storage devices, such as fuel cells or capacitors, have the ability to provide, or store and dispense, electric power and may be used in combination with or in place of batteries. Operating data gathered by sensors, such as the speed of the input member 16 and of the output member 38, may be provided to the controller as well, for various uses, such as when operating in a regenerative braking mode.

The transmission 14 is configured so that an offboard power supply system 58 may be connected with the energy storage device 52 for recharging of the energy storage device 52. The offboard power supply system 58 connects with the energy storage device 52 via an interface 59. The interface 59 may be a plug, in which case an onboard charger (not shown) would be electrically connected between the plug and the energy storage device 52. Such a transmission is referred to as a plug-in hybrid. Alternatively, the interface 59 may be conductive, in which case an offboard charger may be connected between the offboard power supply system 58 and the interface 59, or inductive, in which case an offboard inductive charger would be connected between the offboard power supply 58 and the interface 59. When the energy storage device 52 is sufficiently recharged, the connection through interface 59 is terminated, and the recharged energy storage device 52 is then used under the control of controller 54 to power the motor/generators 18, 20, such as in an electric-only mode (i.e., an operating mode in which only the motor/generators and not the engine, power the vehicle).

It should be appreciated that each of the powertrain embodiments of FIGS. 2-7 also include a similar energy storage device 52, controller 54, and inverter 56 for connection to the engine, motor/generators and torque-transmitting mechanisms described therein, although these are not shown in FIGS. 2-5 for purposes of clarity in the drawings, but will be readily understood by those skilled in the art of transmission design. The energy storage device of each of the powertrains of FIGS. 2-7 may also be configured for connection to an offboard power supply and include an interface, as does powertrain 10.

The engine 12 and motor/generators 18 and 20 are selectively interconnected through the differential gear set 30 by engagement of the torque-transmitting mechanisms 40, 42, 44 in different combinations, to establish different operating modes for the hybrid powertrain 10. For example, the powertrain 10 may be used to launch a vehicle either with the engine off or running. If the engine is off, torque-transmitting mechanism 44 is engaged to ground member 34 and motor/generator 18 is operated as a motor to provide torque in a forward direction at the output member 38. An electrically-variable series hybrid operating mode is provided when engine 12 is on, torque-transmitting mechanism 40 is engaged so that the engine 12 provides power to motor/generator 20, which acts as a generator, providing power to the energy storage device 52 through the inverter 56, and motor/generator 18 acts as a motor with torque-transmitting mechanism 44 engaged. Alternatively, an engine-only operating mode is established by the engaging torque-transmitting mechanisms 40 and 42 and turning off both motor/generators 18, 20.

The powertrain 10 is operable in an electric-only operating mode in which only motor/generator 18 acts as a motor, and torque-transmitting mechanism 44 is engaged. Motor/generator 20 can remain stationary as torque-transmitting mechanism 42 is not engaged. Alternatively, torque-transmitting mechanism 42 may be engaged and both motor/generators 18 and 20 may be controlled to act as motors in a second, load-sharing electric-only mode, to provide power through the differential gear set 30 to the output member 38. This allows a large amount of power to be provided during the electric-only operating mode, while using two motor/generators of a smaller size than the size of a single motor/generator that could provide the same amount of power. In the first of the electric-only operating modes, the torque from motor/generator 18 is added by the differential gear set 30 to reaction torque from the stationary housing 50, but the stationary housing 50 can only contribute torque, and not power. In the second electric-only operating mode, the load-sharing electric-only mode, the motor/generator 20 must supply torque instead of the stationary housing 50. This requires additional electrical input from the inverter 56, but the motor/generator 20 can also supply speed and therefore power to be added to that from motor/generator 18. Because a single motor need not cover the wide range of possible operating conditions, each motor/generator 18, 20 can be designed with a lesser peak capability than a powertrain 10 that relies on tractive power from only one electric motor/generator.

Typically, the torque curve of an electric motor/generator has a speed range of substantially constant torque, followed by a speed range of decreasing power, up to the mechanical speed limit of the motor. Typically, an electric motor/generator has its best efficiency at the center of this operating range. Load-sharing between electric motor/generators 18 and 20 using the speed-adding action of the differential gear set 30 is a selectable option for operation, so that the motor/generators can thus be designed to operate within a more efficient operating range which is suitable for most typical vehicle operating conditions. In another, electrically-variable operating mode, torque-transmitting mechanisms 40 and 42 are engaged and motor/generators 18 and 20 act as either a motor or a generator, depending on operating conditions, with power split through the differential gear set 30. This may be referred to as an electrically-variable, output-split operating mode.

Because the motor/generators 18, 20 are both controllable to act as motors in one of the electric-only operating modes, neither need be designed to provide as large a power output as would be required if only one of the motor/generators could act as a motor in an electric-only operating mode. The motor/generators 18, 20 may be designed with the same or different maximum torque and/or power outputs, torque and/or power outputs for best motor efficiency, input voltage requirement, and/or input current requirements. One advantage of the motor/generators 18, 20 having substantially identical torque, power and current characteristics is the economies of scale when purchasing or constructing and storing the motor/generators, and when assembling the powertrain 10 with identical motor/generators. The motor/generators described below with respect to each of the powertrains of FIGS. 2-7 may also be designed with the same or different maximum torque and/or power outputs, input voltage requirement, and/or input current requirements as well.

FIG. 2 shows a hybrid powertrain 110 that includes an engine 112 operatively connected with a hybrid transmission 114. Within the scope of the invention, the engine 112 may be an internal combustion engine, a diesel engine, a fuel cell, or any other known power plant.

The hybrid transmission 114 includes an input member 116 operatively connected for rotation with an engine output member, such as through a dampening mechanism, as is known. The hybrid transmission 114 includes a first motor/generator 118, labeled M/G A, and a second motor/generator 120, labeled M/G B, both of which are operatively connectable to a differential gear set 130. The motor/generators 118, 120 each include a rotor portion and a stator portion, as is known. Connections of either of the motor/generators 118, 120 to other components of the powertrain 110 such as to members of the differential gear set 130, whether fixed connections or selective connections, are connections with the respective rotor portions of the motor/generators 118, 120.

The differential gear set 130 has a first member 132 that is continuously connected for common rotation with motor/generator 118, a second member 134, and a third member 136 that is continuously connected for common rotation with an output member 138 and with the second motor/generator 120. The differential gear set 130 is shown in lever diagram form, with the members represented as nodes on a lever, as is understood by those skilled in the art. The differential gear set 130 is preferably a planetary gear set having a sun gear member, a ring gear member, and a carrier member that rotatably supports a plurality of pinion gears that mesh with the sun gear member and the ring gear member. For example, the first member 132 may be a sun gear member, the second member 134 may be a carrier member, and the third member 136 may be a ring gear member.

The hybrid transmission 114 includes a plurality of torque-transmitting mechanisms including a first torque-transmitting mechanism 140 that is selectively engagable to connect the input member 116 with the second member 134, and a second torque-transmitting mechanism 142 that is selectively engagable to ground the second member 134 to a stationary housing 150, such as a casing for the transmission 114. The torque-transmitting mechanism 140 may be a rotating friction clutch, dog clutch or any other suitable type of torque-transmitting mechanism. The torque-transmitting mechanism 142 may be a friction clutch with a stationary component, and may be referred to as a brake.

The engine 112 and motor/generators 118 and 120 are selectively interconnected through the differential gear set 130 by engagement of the torque-transmitting mechanisms 140, 142 in different combinations, to establish different operating modes for the hybrid powertrain 110. For example, the powertrain 110 may be used to launch a vehicle either with the engine off or running. If the engine is off, torque-transmitting mechanism 142 is engaged to ground the second member 134 and either or both motor/generators 118 and 120 are operated as motors to provide torque in a forward direction at the output member 138. If the engine 112 is on, torque-transmitting mechanism 140 is engaged so that the engine 112 provides power to the second member 134 and motor/generators 118 and 120 are controlled independently to act as motors or generators depending on vehicle operating conditions, to establish an input-split electrically-variable hybrid operating mode. Alternatively, an engine-only operating mode is available if torque-transmitting mechanism 140 is engaged, the engine 112 is on, and the motor/generators 118, 120 are turned off.

The powertrain 110 is operable in an electric-only operating mode in which only motor/generator 120 acts as a motor. Neither of the torque-transmitting mechanisms 140, 142 are engaged, so the second member 134 can rotate at any speed. Thus, the speed of motor/generator 118 is not determined by the gear set 130, and motor/generator 118 can be controlled to be substantially stationary, or will free-wheel to an equilibrium speed substantially near zero that minimizes losses. Alternatively, in another electric-only operating mode, torque-transmitting mechanism 142 may be engaged and both motor/generators 118 and 120 may be controlled to act as motors to provide power through the differential gear set 130 to the output member 138.

FIG. 3 shows a hybrid powertrain 210 that includes an engine 212 operatively connected with a hybrid transmission 214. Within the scope of the invention, the engine 212 may be an internal combustion engine, a diesel engine, a fuel cell, or any other known power plant.

The hybrid transmission 214 includes an input member 216 operatively connected for rotation with an engine output member, such as through a dampening mechanism, as is known. The hybrid transmission 214 includes a first motor/generator 218, labeled M/G A, and a second motor/generator 220, labeled M/G B, both of which are operatively connectable to a differential gear set 230. The motor/generators 218, 220 each include a rotor portion and a stator portion, as is known. Connections of either of the motor/generators 218, 220 to other components of the powertrain 210 such as to members of the differential gear set 230, whether fixed connections or selective connections, are connections with the respective rotor portions of the motor/generators 218, 220.

The differential gear set 230 has a first member 232, a second member 234 continuously connected for common rotation with the input member 216, and a third member 236 that is continuously connected for common rotation with an output member 238 and with the second motor/generator 220. The differential gear set 230 is shown in lever diagram form, with the members represented as nodes on a lever, as is understood by those skilled in the art. The differential gear set 230 is preferably a planetary gear set having a sun gear member, a ring gear member, and a carrier member that rotatably supports a plurality of pinion gears that mesh with the sun gear member and the ring gear member. For example, the first member 232 may be a sun gear member, the second member 234 may be a ring gear member, and the third member 236 may be a carrier member.

The hybrid transmission 214 includes a plurality of torque-transmitting mechanisms including a first torque-transmitting mechanism 240 that is selectively engagable to connect the first motor/generator 218 with the first member 232, and a second torque-transmitting mechanism 242 that is selectively engagable to ground the second member 234 to a stationary housing 250, such as a casing for the transmission 214. The torque-transmitting mechanism 240 may be a rotating friction clutch, dog clutch or any other suitable type of torque-transmitting mechanism. The torque-transmitting mechanism 242 may be a friction clutch with a stationary component, and may be referred to as a brake.

The engine 212 and motor/generators 218 and 220 are selectively interconnected through the differential gear set 230 by engagement of the torque-transmitting mechanisms 240, 242 in different combinations, to establish different operating modes for the hybrid powertrain 210. For example, the powertrain 210 may be used to launch a vehicle either with the engine off or running. If the engine 212 is off, torque-transmitting mechanism 242 is engaged to ground the second member 234 and motor/generator 220 is operated as a motor to provide torque in a forward direction at the output member 238. If torque-transmitting mechanisms 240 and 242 are both engaged, both motor/generators 218, 220 can be operated as motors to provide torque in a forward direction at the output member 238. If the engine 212 is on, torque-transmitting mechanism 240 can be engaged and motor/generators 218 and 220 controlled independently to act as motors or generators depending on vehicle operating conditions, to establish an input-split electrically-variable hybrid operating mode.

The powertrain 210 is operable in an electric-only operating mode in which only motor/generator 220 acts as a motor. Because torque-transmitting mechanism 240 is disengaged, motor/generator 218 remains substantially stationary regardless of the speed of the member 232. Alternatively, in another electric-only operating mode, torque-transmitting mechanisms 240 and 242 are engaged and both motor/generators 218 and 220 may be controlled to act as motors to provide power through the differential gear set 230 to the output member 238. The powertrain 210 is also operable in an engine-only operating mode in which neither torque-transmitting mechanisms 240 or 242 is engaged, the motor/generators 218 and 220 are turned off, and the engine 212 provides power to the output member 238, with the differential gear set 230 being inactive.

FIG. 4 shows a hybrid powertrain 310 that includes an engine 312 operatively connected with a hybrid transmission 314. Within the scope of the invention, the engine 312 may be an internal combustion engine, a diesel engine, a fuel cell, or any other known power plant.

The hybrid transmission 314 includes an input member 316 operatively connected for rotation with an engine output member, such as through a dampening mechanism, as is known. The hybrid transmission 314 includes a first motor/generator 318, labeled M/G A, and a second motor/generator 320, labeled M/G B. Motor/generator 318 is continuously operatively connected with a first differential gear set 330, as described below, and motor/generator 320 is continuously connected with a second differential gear set 360. The motor/generators 318, 320 each include a rotor portion and a stator portion, as is known. Connections of either of the motor/generators 318, 320 to other components of the powertrain 310 such as to members of the differential gear set 330, whether fixed connections or selective connections, are connections with the respective rotor portions of the motor/generators 318, 320.

The differential gear set 330 has a first member 332 continuously connected for common rotation with the first motor/generator 318, a second member 334, and a third member 336. The differential gear set 330 is shown in lever diagram form, with the members represented as nodes on a lever, as is understood by those skilled in the art. The differential gear set 330 is preferably a planetary gear set having a sun gear member, a ring gear member, and a carrier member that rotatably supports a plurality of pinion gears that mesh with the sun gear member and the ring gear member. For example, the first member 332 may be a sun gear member, the second member 334 may be a ring gear member, and the third member 336 may be a carrier member.

The differential gear set 360 has three members, referred to herein as a fourth member 362, a fifth member 366, and a sixth member 364. The fourth member 362 is continuously connected for common rotation with the second motor/generator 320. The transmission 314 includes an interconnecting member 370 that continuously connects the third member 336 and the fifth member 366 for common rotation with an output member 338. The differential gear set 360 is shown in lever diagram form, with the members represented as nodes on a lever, as is understood by those skilled in the art. The differential gear set 360 is preferably a planetary gear set having a sun gear member, a ring gear member, and a carrier member that rotatably supports a plurality of pinion gears that mesh with the sun gear member and the ring gear member. For example, the fourth member 362 may be a sun gear member, the fifth member 366 may be a carrier member, and the sixth member 364 may be a ring gear member.

The hybrid transmission 314 includes a plurality of torque-transmitting mechanisms including a first torque-transmitting mechanism 340 that is selectively engagable to connect the input member 316 with the second member 334. A second torque-transmitting mechanism 342 is selectively engagable to ground the second member 334 with a stationary member 350, such as a casing for the transmission 314. A third torque-transmitting mechanism 344 is selectively engagable to connect the first motor/generator 318 and the first member 332 for common rotation with the sixth member 364. A fourth torque-transmitting mechanism 346 is selectively engagable to ground the sixth member 364 to the stationary member 350. The torque-transmitting mechanisms 340 and 344 may be rotating friction clutches, dog clutches or any other suitable type of torque-transmitting mechanisms. The torque-transmitting mechanisms 342 and 346 may be friction clutches with a stationary component, and may be referred to as brakes.

The engine 312 and motor/generators 318 and 320 are selectively interconnected through the differential gear sets 330 and 360 by engagement of the torque-transmitting mechanisms 340, 342, 344, and 346 in different combinations, to establish different operating modes for the hybrid powertrain 310. For example, the powertrain 310 may be used to launch a vehicle either with the engine off or running. If the engine 312 is off, any one of four operating modes can be used. In the first of these electric-only operating modes, torque-transmitting mechanism 342 alone is engaged, to ground member 334, and motor/generator 318 alone is operated as a motor to provide torque through gear set 330 to the output member 338. Because the torque-transmitting mechanisms 344 and 346 are not engaged, the speeds of the sixth member 364 and the fourth member 362 are not determined by the gear set 360. The motor/generator 320 can be controlled to zero speed (stationary) or will assume an equilibrium speed that minimizes losses and is substantially zero. In the second electric-only mode, torque-transmitting mechanism 346 alone is engaged to ground member 364, and motor/generator 320 alone is operated as a motor to provide torque through gear set 360 to the output member 338. Because the torque-transmitting mechanisms 340, 342 and 344 are not engaged, the first and second members 332 and 334 will seek an equilibrium speed that minimizes losses in which the speed of the motor/generator 318 is zero or substantially zero, or the motor/generator 318 may be controlled to be stationary. In the third electric-only mode, both torque-transmitting mechanisms 342 and 346 are engaged and both motor/generators 318 and 320 are operated as motors to provide torque in a forward direction at the output member 338. In the fourth electric-only mode, only torque-transmitting mechanism 344 is engaged, to connect motor/generator 318 to member 364, and both motor/generators 318 and 320 are used to provide forward torque through gear set 360 to the output member 338.

If the engine 312 is on, torque-transmitting mechanism 340 can be engaged and torque-transmitting mechanism 342 disengaged, and motor/generator 318 can be controlled to act as either a motor or a generator, depending on vehicle operating conditions, to establish an input-split electrically-variable hybrid operating mode. A second electrically-variable mode can be established by then engaging torque-transmitting mechanism 344 in addition to torque-transmitting mechanism 340, and controlling motor/generator 320 to act as either a motor or a generator as well, establishing a compound-split electrically-variable hybrid operating mode, providing power at the output member 338 through the differential gear sets 330, 360.

Figure 5:
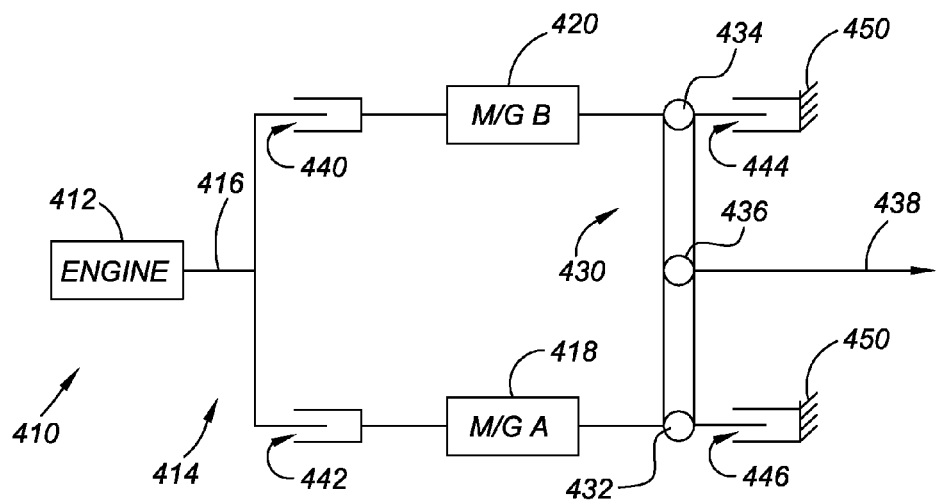
FIG. 5 is a schematic illustration of a fifth embodiment of a hybrid powertrain having one differential gear set shown in lever diagram form.

FIG. 5 shows a hybrid powertrain 410 that includes an engine 412 operatively connected with a hybrid transmission 414. Within the scope of the invention, the engine 412 may be an internal combustion engine, a diesel engine, a fuel cell, or any other known power plant.

The hybrid transmission 414 includes an input member 416 operatively connected for rotation with an engine output member, such as through a dampening mechanism, as is known. The hybrid transmission 414 includes a first motor/generator 418, labeled M/G A, and a second motor/generator 420, labeled M/G B. Motor/generator 418 and 420 are both continuously operatively connected with a differential gear set 430, as described below. The motor/generators 418, 420 each include a rotor portion and a stator portion, as is known. Connections of either of the motor/generators 418, 420 to other components of the powertrain 410 such as to members of the differential gear set 430, whether fixed connections or selective connections, are connections with the respective rotor portions of the motor/generators 418, 420.

The differential gear set 430 has a first member 432 continuously connected for common rotation with the first motor/generator 418, a second member 434 continuously connected for common rotation with the second motor/generator 420, and a third member 436 continuously connected for common rotation with output member 438. The differential gear set 430 is shown in lever diagram form, with the members represented as nodes on a lever, as is understood by those skilled in the art. The differential gear set 430 is preferably a planetary gear set having a sun gear member, a ring gear member, and a carrier member that rotatably supports a plurality of pinion gears that mesh with the sun gear member and the ring gear member. For example, the first member 432 may be a sun gear member, the second member 434 may be a ring gear member, and the third member 436 may be a carrier member.

The hybrid transmission 414 includes a plurality of torque-transmitting mechanisms including a first torque-transmitting mechanism 440 that is selectively engagable to connect the input member 416 with the second member 434. A second torque-transmitting mechanism 442 is selectively engagable to connect the input member 416 with the first member 432. A third torque-transmitting mechanism 444 is selectively engagable to ground the second member 434 and the motor/generator 420 to the stationary member 450. A fourth torque-transmitting mechanism 446 is selectively engagable to ground the first member 432 and the motor/generator 418 to the stationary member 450. The torque-transmitting mechanisms 440 and 442 may be rotating friction clutches, dog clutches or any other suitable type of torque-transmitting mechanisms. The torque-transmitting mechanisms 444 and 446 may be friction clutches with a stationary component, and may be referred to as brakes.

The engine 412 and motor/generators 418 and 420 are selectively interconnected through the differential gear set 430 by engagement of the torque-transmitting mechanisms 440, 442, 444, and 446 in different combinations, to establish different operating modes for the hybrid powertrain 410. For example, in one electric-only operating mode, if the engine 412 is off, the motor/generator 418 may be used alone as a motor to provide power at the output member 438 if torque-transmitting mechanism 444 is engaged. Motor/generator 420 will be stationary. Alternatively, in another electric-only operating mode, motor/generator 420 may be used alone as a motor to provide power at the output member 438 if torque-transmitting mechanism 446 is engaged. Motor/generator 418 will be stationary. In yet another electric-only operating mode, if none of the torque-transmitting mechanisms are engaged, both motor/generators 418 and 420 may be operated as motors to provide torque in a forward direction at the output member 438. The motor/generators 418 and 420 may be substantially identical and connected to members 432 and 434 of the differential gear set 430, wherein the members 432 and 434 have substantially different numbers of teeth and therefore a substantially different torque ratio and speed ratio between each of the motors 418 and 420 is established with the output 438, so that the controller (not shown) has two different choices for operation with one motor alone. Alternately, the motor/generators 418 and 420 may be substantially different in torque and power capacity and in torque and power output for best efficiency, so that the controller (not shown) has two different choices for operation with one motor alone, each of which may be most efficient in some of the various powertrain operating conditions. Furthermore, the motor/generators 418 and 420 may be different in general type, e.g. one induction motor/generator and one permanent-magnet magnet motor/generator, or in specific type of permanent magnet motor/generator, e.g. one relying almost exclusively on torque produced by permanent magnets (such as a flat-magnet or surface-magnet type) and one relying on comparable amounts of torque produced by permanent magnets and by iron in the rotor (such as a V-magnet type) with substantially different characteristics, each appropriate for different powertrain operating conditions. Such similarities or differences in motor/generators may also be utilized in each of the other embodiments described herein.

If the engine 412 is on, torque-transmitting mechanism 440 can be engaged, while motor/generator 418 is controlled to act as either a motor or a generator, depending on vehicle operating conditions, to establish an input-split electrically-variable hybrid operating mode. A second input-split electrically-variable mode can be established by instead engaging torque-transmitting mechanisms 442, and controlling motor/generator 420 to act as either a motor or a generator to providing power at the output member 438 through the differential gear set 430. A fixed speed ratio may be established between the input member 416 and the output member 438 by engaging both torque-transmitting mechanisms 440 and 446. A fixed speed ratio is also selectable by engaging both torque transmitting mechanisms 442 and 444. Another fixed speed ratio, direct drive, is selectable by engaging both torque transmitting mechanisms 440 and 442.

Figure 6:
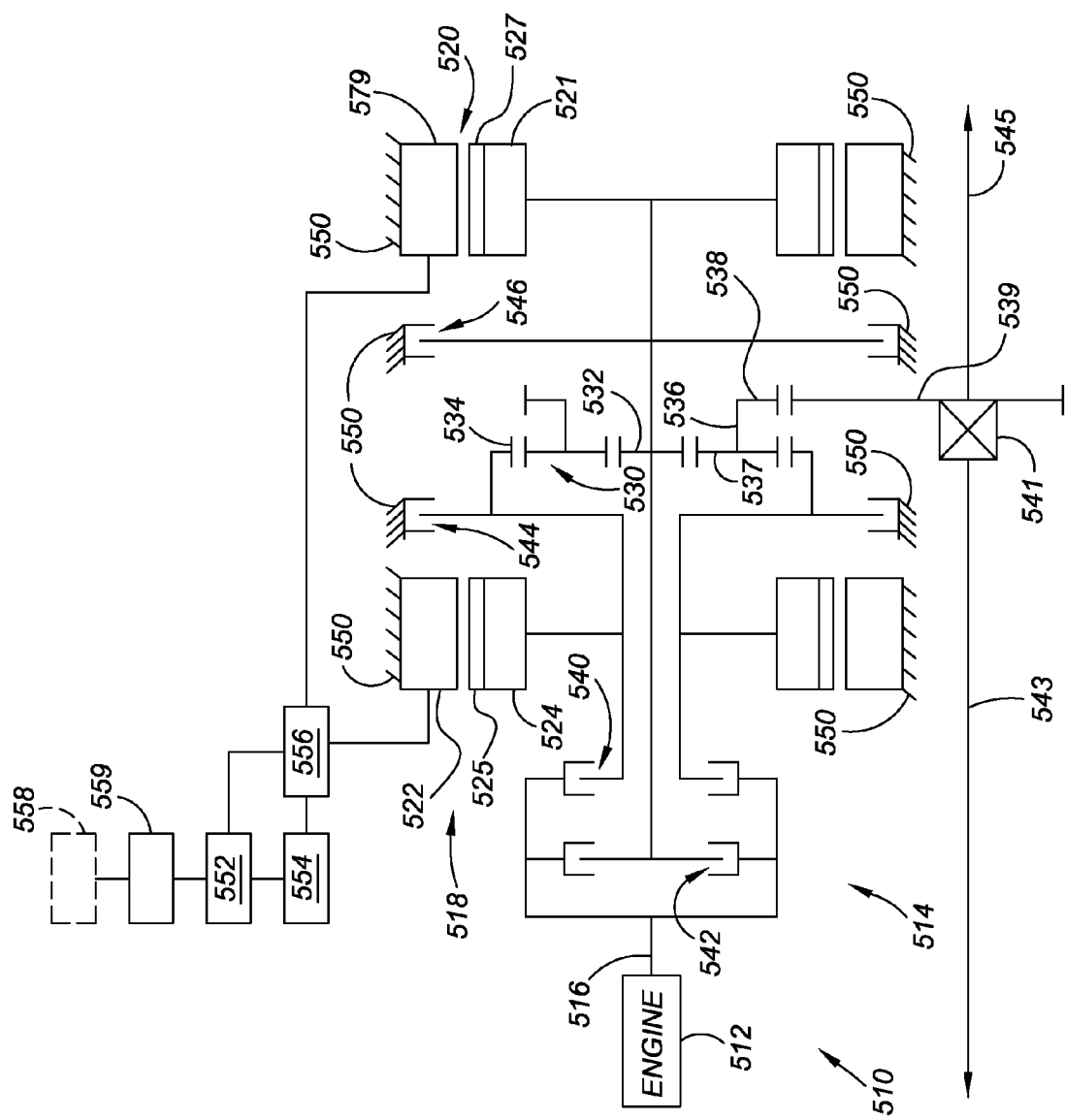
FIG. 6 is a schematic illustration of the hybrid powertrain of FIG. 5 in stick diagram form.

FIG. 6 is a powertrain 510 in stick diagram form that represents one embodiment of the powertrain 410 of FIG. 5 in lever diagram form. The powertrain 510 includes an engine 512 operatively connected with a hybrid transmission 514. Within the scope of the invention, the engine 512 may be an internal combustion engine, a diesel engine, a fuel cell, or any other known power plant.

The hybrid transmission 514 includes an input member 516 operatively connected for rotation with an engine output member, such as through a dampening mechanism, as is known. The hybrid transmission 514 includes a first motor/generator 518 that includes a stator portion 522 grounded to a stationary member 550, such as a transmission casing. The motor/generator 518 also includes a rotor portion 524. The rotor portion 524 has permanent magnets 525 circumferentially spaced therearound such that the electric motor/generator 518 is a permanent-magnet motor/generator. A second motor/generator 520 includes a stator portion 579 grounded to the stationary member 550 and a rotor portion 521. The rotor portion 521 has slots 527 circumferentially spaced therearound such that the electric motor/generator 520 is a reluctance motor/generator.

The powertrain 510 includes a differential gear set 530 that is a planetary gear set and may be referred to as planetary gear set 530. The planetary gear set 530 includes a sun gear member 532, a ring gear member 534 and a carrier member 536 that rotatably supports a set of pinion gears 537 that mesh with both the ring gear member 534 and the sun gear member 532. A gear 538, also referred to herein as the output member, rotates commonly with the carrier member 536 and meshes with a gear 539. Gear 539 transfers torque to driveshafts 543, 545 through a differential 541.

The ring gear member 534 is connected for common rotation with the rotor portion 524 of the motor/generator 518. The sun gear member 532 is connected for common rotation with the rotor portion 521 of the motor/generator 520.

The hybrid transmission 514 includes a plurality of torque-transmitting mechanisms including a first torque-transmitting mechanism 540 that is selectively engagable to connect the input member 516 with the ring gear member 534. A second torque-transmitting mechanism 542 is selectively engagable to connect the input member 516 with the sun gear member 532. A third torque-transmitting mechanism 544 is selectively engagable to ground the ring gear member 534 and rotor portion 524 to the stationary member 550. A fourth torque-transmitting mechanism 546 is selectively engagable to ground the sun gear member 532 and rotor portion 521 to the stationary member 550. The torque-transmitting mechanisms 540 and 542 may be rotating friction clutches, dog clutches or any other suitable type of torque-transmitting mechanisms. The torque-transmitting mechanisms 544 and 546 may be friction clutches with a stationary component, and may be referred to as brakes.

The powertrain 510 has an onboard energy storage device 552 that is operatively connected to the motor/generators 518, 520 such that the motor/generators 518, 520 may transfer power to or receive power from the energy storage device 552. An electronic controller 554 is operatively connected to the energy storage device 552 to control the distribution of power from or to the energy storage device to the motor/generators 518, 520 through a power inverter 556. The controller 554 (or one or more separate controllers) is also operatively connected to the engine 512 and the torque-transmitting mechanisms 540, 542, 544, and 546, and controls engagement and disengagement thereof based on vehicle operating conditions. Operating data gathered by sensors, such as the speed of the input member 516 and of the output member 538, may be provided to the controller 554 as well, for various uses, such as when operating in a regenerative braking mode. The transmission 514 is configured so that an offboard power supply system 558 may be connected with the energy storage device 552 for recharging of the energy storage device 552. The offboard power supply system 558 connects with the energy storage device 552 via an interface 559, and may be configured as described with respect to the offboard power supply system 58 and interface 59 of FIG. 1.

Because powertrain 510 is one embodiment of the powertrain 410, each component of the powertrain 410 has a corresponding component on powertrain 510. For example, the planetary gear set 530 corresponds with differential gear set 430. Sun gear member 532 corresponds with first member 432, ring gear member 534 corresponds with second member 434, and carrier member 536 corresponds with the third member 436. Motor/generators 518 and 520 correspond with motor/generators 418 and 420, respectively. Torque-transmitting mechanisms 540, 542, 544, and 546 correspond with torque-transmitting mechanisms 440, 442, 444, and 446, respectively. Input member 516 and output member 538 correspond with input member 416 and output member 438, respectively.

The engine 512 and motor/generators 518 and 520 are selectively interconnected through the differential gear set 530 by engagement of the torque-transmitting mechanisms 540, 542, 544, and 546 in different combinations, to establish different operating modes for the hybrid powertrain 510. For example, if the engine 512 is off, in one electric-only operating mode, the motor/generator 520 may be used alone as a motor to provide power at the output member 538 if torque-transmitting mechanism 544 is engaged, with motor/generator 518 thereby being stationary. Alternatively, in another electric-only operating mode, motor/generator 518 may be used alone as a motor to provide power at the output member 538 if torque-transmitting mechanism 546 is engaged, with motor/generator 520 thereby being stationary. If none of the torque-transmitting mechanisms are engaged, both motor/generators 518 and 520 may be operated as motors to provide torque in a forward direction at the output member 538. If the engine 512 is on, torque-transmitting mechanism 540 can be engaged, while motor/generator 520 is controlled to act as either a motor or a generator, depending on vehicle operating conditions, to establish an input-split electrically-variable hybrid operating mode. A second input-split electrically-variable mode can be established by instead engaging torque-transmitting mechanism 542 and controlling motor/generator 518 to act as either a motor or a generator to providing power at the output member 538 through the differential gear set 530. Two engine-only operating modes are available when the engine 512 is on and both motor/generators 518, 520 are turned off: a first engine-only operating mode is by engaging torque-transmitting mechanism 540 and a second is by engaging torque-transmitting mechanism 542.

While the best modes for carrying out the invention have been described in detail, those familiar with the art to which this invention relates will recognize various alternative designs and embodiments for practicing the invention within the scope of the appended claims.

The invention claimed is:

1. A hybrid powertrain comprising:
an input member;
an output member;
an engine operatively connected with the input member;
first and second electric motor/generators;
a differential gear set having multiple members;
selectively engageable torque-transmitting mechanisms;
wherein at least some of the input member, the output member, the engine and the motor/generators are selectively interconnected through the differential gear set by engagement of different combinations of the torque-transmitting mechanisms;
an electronic controller operatively connected to the electric motor/generators and configured to control the electric motor/generators to provide multiple operating modes between the input member and the output member, including:
a first electric-only operating mode in which the engine is off, one of the first and second electric motor/generators acts as a motor to provide torque at the output member while the other of the first and second electric motor/generators is not connected to any of the members of the differential gear set and is able to remain substantially stationary; and
a second electric-only operating mode in which the engine is off and both first and second electric motor/generators act as motors to provide torque at the output member; and
wherein the engine is not continuously connected to any of the members of the differential gear set and is selectively connectable for common rotation with the second motor/generator by engagement of one of the torque-transmitting mechanisms.

2. The hybrid powertrain of claim 1, wherein the first and second electric motor/generators are characterized by substantially identical maximum torque and power output.

3. The hybrid powertrain of claim 1, wherein the first and second electric motor/generators are characterized by substantially identical input voltage and input current requirements.

4. The hybrid powertrain of claim 1, wherein the first and second electric motor/generators are characterized by different maximum torque and power outputs.

5. The hybrid powertrain of claim 1, wherein the first and second electric motor/generators are characterized by different torque and power outputs for maximum efficiency.

6. The hybrid powertrain of claim 1, further comprising:
an energy storage device operatively connected to each of said first and second motor/generators for providing power to and receiving power from said first and second motor/generators, wherein said energy storage device is configured to be operatively connectable with an off-board power supply for recharging said energy storage device.

7. The hybrid powertrain of claim 1, wherein the multiple operating modes include an engine-only operating mode.

8. The hybrid powertrain of claim 1, wherein the multiple operating modes include an operating mode in which the engine is on and only one of the first and second electric motor/generators acts as a motor to provide torque at the output member.

9. The hybrid powertrain of claim 1, wherein the multiple operating modes include an operating mode in which the engine is on and provides torque at the output member and both of the first and second electric motor/generators act as motors to provide torque at the output member.

10. A hybrid powertrain comprising:
an input member;
an output member;
an engine operatively connected with the input member;
first and second electric motor/generators;
a differential gear set having multiple members;
selectively engageable torque-transmitting mechanisms;
wherein at least some of the input member, the output member, the engine and the motor/generators are selectively interconnected through the differential gear set by engagement of different combinations of the torque-transmitting mechanisms;
a stationary member;
wherein the multiple members include a first, a second, and a third member; wherein the first electric motor/generator is continuously connected with said first member;
wherein a first of the torque-transmitting mechanisms is selectively engageable to connect the input member to the second motor/generator; wherein a third of the torque-transmitting mechanisms is selectively engageable to ground the second member to the stationary member; wherein a second of the torque-transmitting mechanisms is selectively engageable to connect the second electric motor/generator to the second member; wherein the output member is connected for common rotation with the third member;
an electronic controller operatively connected to the electric motor/generators and configured to control the electric motor/generators to provide multiple operating modes between the input member and the output member, including:
a first electric-only operating mode in which the engine is off, and one of the first and second electric motor/generators acts as a motor to provide torque at the output member while the other of the first and second electric motor/generators is able to remain substantially stationary;

a second electric-only operating mode in which the engine is off and both first and second electric motor/generators act as motors to provide torque at the output member;

an output-split operating mode in which the first and third torque-transmitting mechanisms are engaged, the engine is on, and only the first electric motor/generator acts as a motor; and a series operating mode in which the first and second torque-transmitting mechanisms are engaged, the engine is on, and the second electric motor/generator acts as a generator to power the first electric motor/generator which acts as a motor.

11. The hybrid powertrain of claim 10, wherein the first and second electric motor/generators are characterized by substantially identical maximum torque and power output.

12. The hybrid powertrain of claim 10, wherein the first and second electric motor/generators are characterized by substantially identical input voltage and input current requirements.

13. The hybrid powertrain of claim 10, wherein the first and second electric motor/generators are characterized by different maximum torque and power outputs.

14. The hybrid powertrain of claim 10, wherein the first and second electric motor/generators are characterized by different torque and power outputs for maximum efficiency.

15. The hybrid powertrain of claim 10, wherein the multiple operating modes include an engine-only operating mode.

16. The hybrid powertrain of claim 10, wherein the multiple operating modes include an operating mode in which the engine is on and provides torque at the output member and both of the first and second electric motor/generators act as motors to provide torque at the output member.

17. The hybrid powertrain of claim 10, wherein the engine is not continuously connected to any of the members of the differential gear set and is selectively connectable for common rotation with the second motor/generator by engagement of one of the torque-transmitting mechanisms.

* * * * *